United States Patent

[11] 3,596,700

| [72] | Inventors | Stanford E. Groves<br>Baton Rouge;<br>Hal G. Ginn, Baker; John D. Sutherland, Jr., Prairieville, all of, La. |
|---|---|---|
| [21] | Appl. No. | 632,226 |
| [22] | Filed | Apr. 20, 1967 |
| [45] | Patented | Aug. 3, 1971 |
| [73] | Assignee | Copolymer Rubber & Chemical Corporation |

[54] APPARATUS FOR RECOVERING POLYMERS FROM SOLUTION
5 Claims, 4 Drawing Figs.

[52] U.S. Cl. ........................................ 159/16
[51] Int. Cl. ....................................... B01d 1/14
[50] Field of Search .......................... 159/2, 3, 4 B, 4 I, 16, 16 A, 4, 47

[56] References Cited
UNITED STATES PATENTS

| 1,594,065 | 7/1926 | MacLachlan | 159/4 B |
| 1,705,822 | 3/1929 | Lindsey | 99/324 |
| 1,006,823 | 10/1911 | Block | 159/2 X |
| 2,915,489 | 12/1959 | White | 260/33.6 |
| 3,042,970 | 7/1962 | Terenzi | 264/11 |
| 3,050,113 | 8/1962 | Rundquist | 159/13 |
| 3,233,655 | 2/1966 | Graham | 159/4 I |
| 3,306,342 | 2/1967 | DiSalvo et al. | 159/16 X |
| 3,450,184 | 6/1969 | Schnoring et al. | 159/16 |

FOREIGN PATENTS

| 869,143 | 5/1961 | Great Britain | 159/4 B |

*Primary Examiner*—Norman Yudkoff
*Assistant Examiner*—J. Sofer
*Attorney*—McDougall, Hersh, Scott & Ladd

ABSTRACT: New and improved apparatus for separating polymers from solutions thereof wherein the polymer solution is extruded through an adjustable valve formed by a valve seat having a diverging conical seating surface and a moveable valve member in the form of a diverging frustocone and the resulting cone-shaped polymer thus extruded is broken up into particles of solid particles by a fluid jet, and preferably a steam jet, from an annular header spaced about the valve whereby the crumb size of the resulting polymer can be controlled by displacement of the valve member relative to the valve seat.

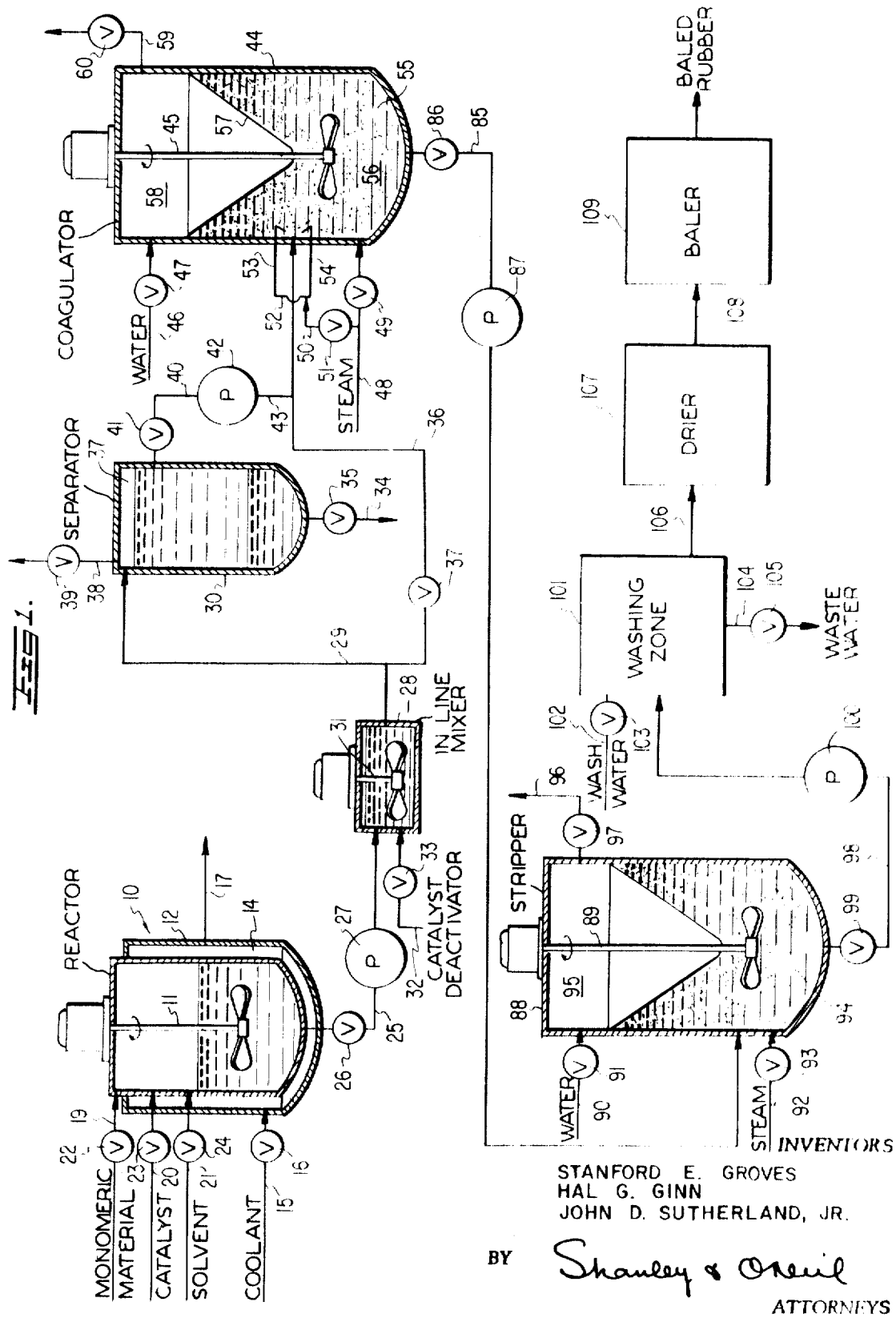

Patented Aug. 3, 1971
3,596,700
2 Sheets-Sheet 2
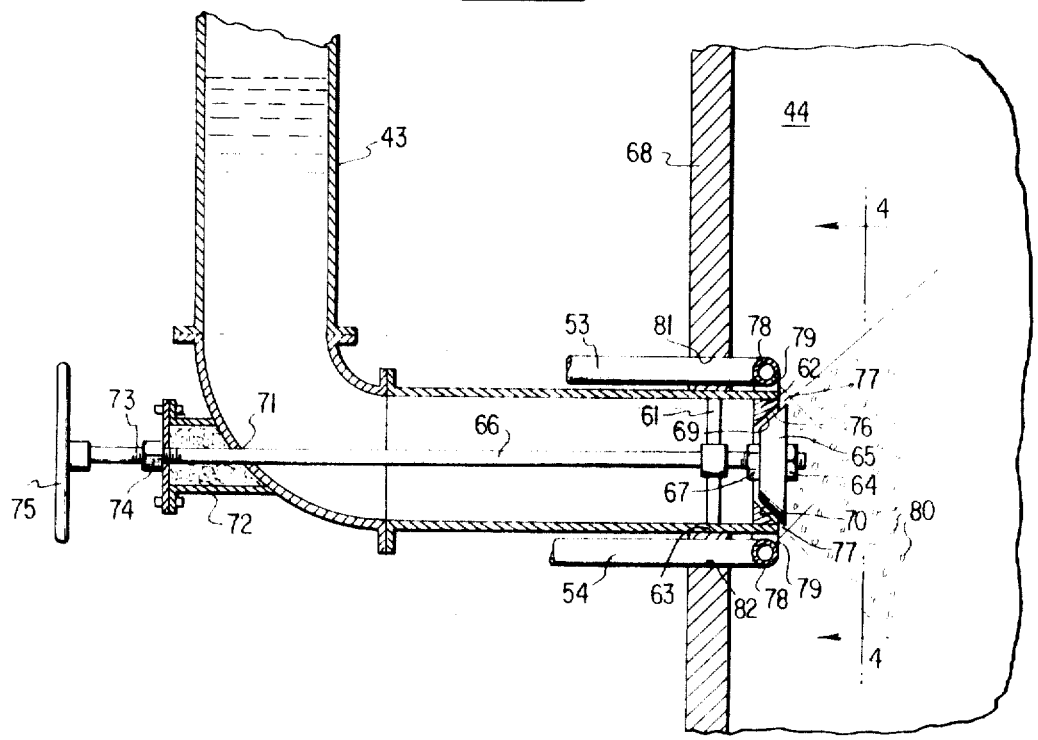
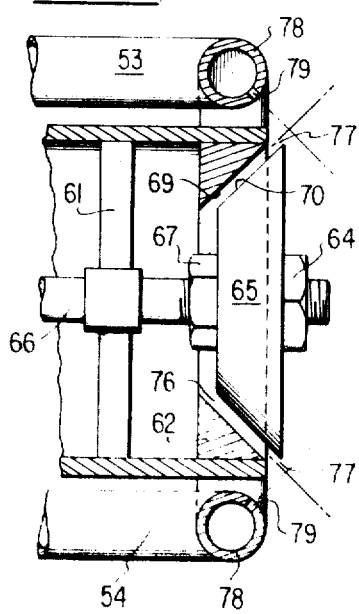
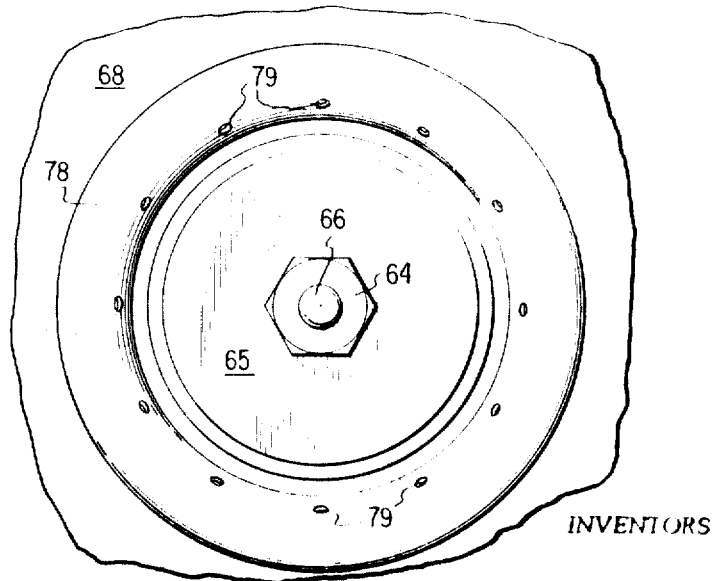
INVENTORS
STANFORD E. GROVES
HAL G. GINN
JOHN D. SUTHERLAND, JR.
BY Shanley & O'neil
ATTORNEYS

APPARATUS FOR RECOVERING POLYMERS FROM SOLUTION

This invention broadly relates to a novel method and improved apparatus for recovering polymers from solution. In some of its more specific aspects, the invention further relates to a method and apparatus for controlling the size of polymer crumb and markedly reducing the ash content thereof.

A number of methods have been proposed heretofore for polymerizing monomeric mixtures in solution in an organic solvent and in the presence of a metal-containing catalyst. The resulting reaction mixture is a solution of the polymer in the polymerization solvent which also contains metallic impurities derived from the polymerization catalyst. It is desirable that the catalyst residue be removed before or during the polymer recovery step so as to produce a solid polymer substantially free of metallic impurities which has a low ash content.

Polymers having a high ash content are undesirable for a number of reasons. For example, rubbery polymers are often used in electrical insulation, or in other electrical applications, and a high ash content results in poor electrical properties including high conductivity, poor dielectric constant, dissipation factor, etc. A high ash content is also often associated with accelerated heat aging and/or undesirable discoloration of the polymer, either as produced or upon heating to an elevated temperature such as during a vulcanization step in instances where elastomers are produced. The resulting polymers are unsatisfactory for certain uses where good heat aging and/or a light or snow-white color are or primary importance.

In addition to the foregoing, often practical problems arise during the coagulation of polymer solutions by prior art processes. In one prior art coagulation process, a solution of a rubbery polymer is introduced into a vessel which is partially filled with hot water, and steam is injected for the purpose of heating the water and removing the solvent to thereby recover the solid rubber. The rubber is preferably produced in the form of crumb having a carefully controlled particle size, and the coagulation must be conducted under conditions whereby the rubber is not plated out or otherwise deposited on internal surfaces within the coagulator. However, it has not been possible to readily control the crumb size at the optimum level and prevent the deposition of polymer on internal surfaces when using the prior art method and apparatus.

The art has long sought an entirely satisfactory method and apparatus whereby solid polymer may be recovered from organic solvent solutions thereof in the form of crumb having a desirable size in the absence of the above-mentioned difficulties of the prior art, and with the ash content thereof being reduced to a level whereby the electrical properties and color are entirely satisfactory. However, such a method and apparatus were not available prior to the present invention.

It is an object of the present invention to provide a novel method of recovering polymers from organic solvent solutions in the form of crumb having a desired particle size.

It is still a further object to provide a novel method of preparing highly porous polymer crumb from which catalyst residues may be readily removed by washing with water to thereby produce a low ash content.

It is still a further object to provide improved apparatus for coagulating organic solvent solutions of polymer whereby polymer crumb having a desired particle size may be produced without the attendant difficulties of the prior art.

Still other objects and advantages of the invention will be apparent to those skilled in the art upon reference to the following detailed description and the drawings, wherein:

FIG. 1 is a flow diagram illustrating a system in accordance with the invention for the solution polymerization of monomeric materials and the recovery of solid polymer from the resulting solution of polymer in the form of crumb;

FIG. 2 is a fragmentary sectional view of the improved coagulator of FIG. 1 which illustrates the apparatus of the invention for the control of polymer crumb size;

FIG. 3 is an enlarged fragmentary sectional view in elevation of the improved apparatus of FIG. 2 for the control of polymer crumb size; and FIG. 4 is an enlarged elevational view of the improved apparatus of FIG. 2 taken along the line 4—4.

Upon reference to the drawings, the reactor 10 is provided with a motor-driven agitator 11 and a spaced jacket 12 which forms an annular space 14 to which a coolant is supplied via line 15 at a rate controlled by valve 16 and withdrawn via line 17. The monomeric material to be polymerized which may include ethylene, propylene and a polyene monomer, the catalyst which may be a Ziegler-type polymerization catalyst prepared from a vanadium compound and an alkylaluminum halide, and the organic polymerization solvent which may be hexane, are shown as being fed to reactor 10 via conduits 19, 20 and 21 at rates controlled by valves 22, 23 and 24, respectively, in the interest of simplifying the drawings. However, it is understood that each of the monomers may be fed to the reactor separately, as may be each of the catalyst components in instances where two or more catalyst components are used.

The resulting solution of polymer is withdrawn from reactor 10 via conduit 25 at a rate controlled by valve 26 and transferred by means of pump 27 to in-line mixer 28 which is provided with a motor-driven agitator 31, and then via conduit 29 to separator 30. The stream flowing in conduit 25 contains dissolved polymer, unreacted monomeric material and metal-containing active polymerization catalyst and/or catalyst residues. The active polymerization catalyst may be deactivated in mixer 28 by supplying thereto a prior art catalyst deactivator via conduit 32 at a rate controlled by valve 33. In instances where a Ziegler-type organometallic catalyst is employed, then a polar compound including, for example, substances such as isopropyl alcohol or other lower water soluble alcohols, or water itself may be fed to mixer 28 via conduit 32 and thoroughly admixed with the solution of polymer by means of agitator 31.

Water is usually the preferred catalyst-deactivating agent when a Ziegler-type catalyst is used in the polymerization. In such instances, the water is preferably added and the catalyst is killed in accordance with the invention disclosed and claimed in copending application Ser. No. 569,836, filed Aug. 3, 1966, in the name of Hal G. Ginn for "Preparation of Elastomers," the teachings of which are incorporated herein by reference. When carrying out the catalyst killing step in accordance with this copending application, preferably about 0.1—1 volume of water for each volume of polymer solution are admixed in the in-line mixer 28 within 10 minutes, and preferably within 5 minutes, from the time that the polymer solution is withdrawn from reactor 10. The water is admixed with the polymer solution within mixer 28 under agitation conditions as defined by Reynold's numbers within the turbulent range, such as a Reynold's number of 2000—100,000 and preferably about 5,000—50,000.

Upon opening valve 41 in conduit 40 and closing valve 37 in conduit 36, the mixture of catalyst deactivator and polymer solution flowing in conduit 29 is passed to separator 30. When the catalyst deactivator is immiscible with the polymer solution, such as when water is used to kill the catalyst, the separated water may be withdrawn from separator 30 via conduit 34 at a rate controlled by valve 35. The polymer solution, which still contains the unreacted monomeric material and at least some of the catalyst residue, is withdrawn from separator 30 via conduit 40 at a rate controlled by valve 41, and transferred by means of pump 42 via conduit 43 into coagulator 44.

Alternatively, separator 30 and pump 42 may be bypassed by closing valve 41 and opening valve 37. In such event, the mixture of catalyst deactivator, deactivated catalyst and polymer solution is passed directly into coagulator 44 via conduit 43. The catalyst deactivator and/or the "solubilized" deactivated catalyst residue is admixed in the water that is supplied to the coagulator and is withdrawn and separated along with the water from the resulting crumb rubber as will be described more fully hereinafter. The solubilized catalyst residue has surface active properties which tend to increase the amount of emulsification under the intense agitation conditions that exist in mixer 28, and operation in the above manner is especially helpful in instances where the catalyst deactivator and the polymer solution tend to form an emulsion which does not break readily.

The coagulator 44 is provided with a rapidly rotating motor-driven agitator 45, and water is admitted thereto via conduit 46 at a rate controlled by valve 47. Sufficient steam for the purpose of heating the water within coagulator 44 to a desired temperature for evaporation of polymerization solvent and/or unreacted monomers from the polymer stream flowing in conduit 43 is supplied to coagulator 44 via conduit 48 at a rate controlled by valve 49. Also, steam for subdividing the entering polymer stream into fragments of a desired size is fed to coagulator 44 via conduit 50, header 52 and conduits 53 and 54 at a rate controlled by valve 51, as will be more fully explained hereinafter. The coagulator 44 is partially filled with a slurry 56 of particles 55 of polymer crumb in water, and the agitator 45 is operated sufficiently vigorously to impart a rotary, swirling motion to the slurry 56 which results in a water level having the configuration as noted at 57. The interior of coagulator 44 is free of baffles or other obstructions which would interfere with imparting a swirling motion to the contents. The vapor phase 58 contains water vapor, solvent vapor, and/or gaseous monomeric material, and vapor is withdrawn therefrom via conduit 59 at a rate controlled by valve 60. The solvent and unreacted monomer content of the vapor may be recovered and purified for recycle to the reactor 10, if desired, in accordance with prior art practices.

As is best seen in FIGS. 2, 3 and 4, the manner in which the polymer solution is fed into the coagulator 44, and thereafter broken into fragments of a size suitable for forming polymer crumb, is of utmost importance. This is preferably accomplished by mounting member 65, which is constructed in the form of a conical frustum, on the end of stem 66 between enlarged portion 67 and nut 64. The end of conduit 43 extends through opening 63 in wall 68 into the interior of coagulator 44, and on the outer portion thereof, there is mounted an internally arranged annular member 62. The member 62 has an inwardly facing sloped annular surface 69 which forms a seat for the outwardly facing sloped annular surface 70 of member 65. The member 65 is seated inwardly in the coagulator 44 with respect to the surface 69, the inner end of stem 66 extends through the inner end of conduit 43, and the outer end of stem 66 extends through an opening 71 in conduit 43 provided with stuffing box 72 and then to the exterior. The stem 66 is provided with threads 73 on the outer end which are threaded through member 74, thereby allowing the valve stem 66 and member 65 carried thereby to be moved axially back and forth upon rotating handwheel 75. The stem 66 is also provided with a spider 61, which assures that the stem 66 is maintained in the center of conduit 43. Thus, rotation of hand wheel 75 moves the surface 70 of the member 65 to or from the surface 69, thereby controlling the distance 76 by which the surfaces 69 and 70 are separated. The distance 76 determines the thickness of the annular or cone-shaped layer of polymer solution 77 which is introduced into the interior of coagulator 44. Thus, the thickness of the annular layer 77 of the polymer solution may be controlled as desired, and this has an effect on the size of the crumb particles which are produced therefrom as thicker layers of polymer solution tend to produce larger crumb particles when all other variables remain constant.

The ends of steam lines 53 and 54 extend through openings 81 and 82, respectively, in wall 68 into the interior of coagulator 44 and communicate with an annular header 78, which is provided with a plurality of openings 79 through which the steam is directed onto the annular conelike extrusion of polymer solution 77. Preferably, the openings 79 extend through the wall of header 78 at approximately a 30° angle to effectively direct the steam onto the annular body of polymer solution 77 at about a 90° angle with the surface thereof, thereby causing it to be broken into small fragments 80.

The size of the fragments 80 may be controlled by the amount of steam introduced through the openings 79, by the steam pressure, and/or by the thickness of the layer of polymer solution 77. Increasing the amount of steam that is introduced, and/or increasing the steam pressure, and/or decreasing the thickness of the annular body of polymer solution 77, tend to produce smaller particles of crumb, and vice versa. Thus, by adjusting or controlling these variables it is possible to form fragments 80 of polymer solution which are of a size that produce, upon evaporation of the solvent and/or removal of the monomeric material, solid polymer particles having a desired crumb size. Also, due to agitation by agitator 45 and the rotary motion of the slurry 56, the fragments 80 are kept suspended and separated in the hot water until the solvent and monomer have been removed sufficiently by evaporation to form a solid polymer particle. The combination of first causing the annular cone-shaped extrusion of polymer solution 77 to be reduced to fragments 80 having a desired size, and then subjecting the fragments 80 to the action of the swirling hot water, allows any desired size of solid polymer particles to be produced. Also, the size of each particle may be controlled within relatively narrow limits to thereby avoid the production of fines which would cause difficulty in the subsequent processing. Additionally, inasmuch as the unreacted monomeric material is present in the polymer solution and it is very volatile, the fragments 80 are expanded thereby and highly porous solid polymer particles are produced. Upon subjecting the resulting porous crumb to the hot water in the coagulator and in the subsequent washing steps to be discussed more fully hereinafter, it has been discovered unexpectedly that the catalyst residue is removed much more completely from the polymer particles than was heretofore possible. In fact, it is possible to reduce the ash content to a level which is almost undetectable.

A slurry of highly porous polymer crumb is withdrawn from coagulator 44 via conduit 85 at a rate controlled by valve 86 and is transferred by pump 87 to stripper 88. The stripper 88 is provided with a motor-driven agitator 89 which is rotated rapidly to keep the polymer crumb in suspension. Water is fed to stripper 88 via conduit 90 at a rate controlled by valve 91, and steam via conduit 92 at a rate controlled by valve 93. The steam is admitted in an amount to maintain the slurry of crumb 94 at a sufficiently elevated temperature to cause any residual solvent and/or monomer to be stripped therefrom, such as at a temperature of about 212—250° F. under a pressure of about 0—30 p.s.i.g. The slurry of crumb 94 only partially fills the stripper 88, and the vapor phase 95 contains small amounts of solvent vapor and water vapor. The vapor is withdrawn via conduit 96 at a rate controlled by valve 97 and the solvent may be recovered for recycle if desired.

A slurry of crumb essentially free of unreacted monomer and solvent is withdrawn via conduit 98 at a rate controlled by valve 99 and transferred by pump 100 to washing zone 101. The crumb is thoroughly washed with water supplied via conduit 102 at a rate controlled by valve 103 for the purpose of removing catalyst residue. The waste water is withdrawn via conduit 104 at a rate controlled by valve 105 and discarded. The washed polymer crumb, now substantially free of unreacted monomer, solvent and catalyst residue, is dewatered, withdrawn via conduit 106, and passed to drier 107 where the water content thereof is removed. The drier 107 may be a prior art extrusion drier, apron drier, etc. Dried crumb is passed from drier 107 via conduit 108 to baler 109, where it is formed into bales of rubber for sale.

The water in the coagulator 44 is maintained at a sufficiently high temperature to rapidly evaporate the unreacted monomers and organic solvent. For example, when hexane is the solvent sufficient steam is admitted to coagulator 44 via conduit 48 to assure a water temperature of about 150—250° F., and preferably 220—230° F., under a pressure of about 0—60 p.s.i.g., and preferably 10—30 p.s.i.g.

If desired, the unreacted monomers may be recovered from the solution of polymer prior to introducing it into the coagulator 44. This may be accomplished by prior art processes, such as by reducing the pressure and warming the solution of polymer to an elevated temperature. The gaseous unreacted monomers may be conveniently removed in separator 30 by providing a conduit 38 including valve 39 leading from the vapor space 37 therein to the exterior. The valve 39 is opened during flashing of the unreacted monomers, thereby reducing the pressure to a lower value such as atmospheric and allowing the gaseous monomers to escape via conduit 38. However, normally it is preferred that the unreacted monomers be retained in the solution of polymer and the mixture introduced into coagulator 44 to assure that a high porous crumb is produced. Otherwise, the polymer crumb has a substantially higher ash content.

The crumb size is preferably 53 at about one-eighth to one-quarter inch. This is accomplished by adjusting the thickness of the layer of polymer solution communicate introduced into the coagulator 44, and the amount and pressure of the steam which is used in breaking up the layer of introduced polymer into fragments of the desired angle 90° size. It is also possible to use a liquid medium or a gaseous medium other than steam for breaking up the layer of polymer, such as vapor of the organic solvent or inert gases including nitrogen, helium, carbon dioxide, etc. The pressure of the steam or other gaseous medium used in breaking up the polymer solution is not critical, but the pressure should be sufficiently high to produce fragments of the desired size. Usually, a pressure differential of about 20—100 p.s.i., and preferably about 50—60 p.s.i., is sufficient for a gaseous medium. When liquid media are used for this purpose, higher differential pressures are usually required such as 200—1,000 p.s.i.

It is preferred that the polymer solution be introduced into coagulator 44 in the form of a cone-shaped layer, but this is not essential. For example, the polymer may be introduced in the form of a relatively thin flat layer which has a substantially greater width than thickness, such as a ratio of width to thickness of at least 2 to 1, and preferably at least 4 to 1. As is well known, at a given solids content increasing the Mooney value of the dissolved polymer increases the viscosity of the solution, and thus wider settings for valve 65 are necessary in order to obtain a desired thickness. The layer of dissolved polymer preferably should have a thickness of about one thirty-second to one-sixteenth inch for best results for elastomer solutions having solids contents of about 5—10 percent by weight. In instances where polymer solutions having higher or lower solids contents are produced, then comparable thicknesses outside of this range may be used. Thicker layers are permissible with elastomer solutions having lower solids contents and thinner layers with elastomer solutions having higher solids contents.

The breaking up of the introduced layer of polymer by means of the agitator 45 is not equivalent to the use of the jets of steam discharged through openings 79. For instance, the rotary, swirling motion of the slurry 56 tends to cause the introduced polymer solution to form particles which are too large and/or the polymer solution is not broken cleanly and evenly into fragments or globules having a desired controlled size. However, the swirling action of slurry 56 is of importance in keeping the fragments of polymer solution separated during the time interval that is required for the solvent to evaporate sufficiently for solid particles to form. Therefore, the combination of agitation by agitator 45 and the jets of steam emitted through openings 79 produces unexpectedly good results.

The present invention may be used in the recovery of a wide variety of polymers from solutions thereof produced by prior art polymerization processes. The invention is especially useful in the coagulation of organic solvent solutions of polymers produced by the polymerization of one or more olefin monomers in solution in an organic solvent and in the presence of an organometallic catalyst. Examples of olefins which may be polymerized in accordance with prior art practices include straight and/or branched chain monoolefins containing, for example, 2—20 carbon atoms and preferably 2— 10 carbon atoms; aromatic olefins substituted with one or more vinyl groups such as styrene, vinyl naphthalene and divinyl benzene; conjugated diolefins containing 4—20 and preferably 4—8 carbon atoms such as butadiene, isoprene, piperylene and 2,3-dimethylbutadiene; linear polyenes containing 3—20 and preferably 3—10 carbon atoms such as allene, 1,2-butadiene, 1,4-hexadiene and 1,5-hexadiene; bridged ring hydrocarbons containing one or more ethylenic double bonds such as the norbornenes, and especially the alkylidene norbornenes and alkenyl norbornenes. Mixtures of one or more of the above monomers may be polymerized.

It is understood that the foregoing monomeric materials are mentioned for purposes of illustration only, and that numerous other monomeric materials may be polymerized by prior art processes to produce an organic solvent solution of polymer to be coagulated in accordance with the invention. Rubbery polymers are usually preferred, such as cis-1,4-polybutadiene, cis-1,4-polyisoprene, sytrene-butadiene rubber copolymers, ethylene-propylene copolymers, and ethylene-propylene-polyene monomer terpolymers. Also preferably at least one of the monomers making up the monomeric mixture to be polymerized is normally gaseous, or has an appreciable vapor pressure at the temperature of the polymer recovery step to thereby cause a porous crumb to be produced.

The preparation of polymers from the foregoing monomers is well known and is described in a large number of issued United States patents and other publications, including the following: Introduction to Rubber Technology, edited by M. Morton, Reinhold Publishing Corporation, New York (1959); Synthetic Rubber Technology, Volume I, by W. S. Penn, Maclaren and Sons, Ltd., London 1960); Rubber, Fundamentals of Its Science and Technology, J. LeBras, Chemical Publishing Company, Inc., New York (1957); and Linear and Stereoregular Addition Polymers, N. G. Gaylord, et al., Innerscience Publishers, New York (1959).

The invention is especially useful in coagulating organic solvent solutions of elastomers produced by interpolymerizing a monomeric mixture containing ethylene, at least one straight chain alpha monoolefin containing 3-16 carbon atoms, and a polyunsaturated hydrocarbon having at least one carbon-to-carbon double bond, in solution in an organic polymerization solvent and in the presence of a Ziegler catalyst. In general, the basic reaction conditions and ratios of monomers may be the same as those employed in the prior art, and usually the residual unsaturation should be about 2—60 carbon-to-carbon double bonds per 1000 carbon atoms. It is preferred that the monomeric mixture contain ethylene, propylene and a polyunsaturated bridged-ring hydrocarbon in proportions to produce a polymer having good elastomeric properties and an unsaturation level of at least 2 carbon-to-carbon double bonds per 1000 carbon atoms. For example, the elastomer may contain chemically bound therein molar ratios of ethylene to propylene varying between about 80:20 and 20:80. The bridged-ring hydrocarbon may be chemically bound therein in an amount to provide an unsaturation level of 2—60, and preferably about 2—30 carbon-to-carbon double bonds per 1,000 carbon atoms. The specific unsaturation level that is selected in a given instance will depend upon the desired rate of cure or other property.

In instances where it is desired to prepare a tetrapolymer, or a polymer from five or more different monomers, then one or more alpha monoolefins containing 4—16 carbon atoms may be substituted for an equal molar quantity of bound propylene in the above-mentioned monomer compositions. When preparing tetrapolymers, the range of the fourth monomer will normally be about 5—20 mol percent, but smaller amounts may be used such as 1, 2, 3, or 4 mol percent.

Examples of the bridged-ring hydrocarbons include the polyunsaturated derivatives of bicyclo (2,2,1) heptane wherein at least one double bond is present in one of the bridged rings, such as dicyclopentadiene, bicyclo (2,2,1) hepta-2,5-diene, the alkylidene norbornenes, and especially the 5-alkylidene-2-norbornenes wherein the alkylidene group contains 1—20 carbon atoms and preferably 1—8 carbon atoms, the alkenyl norbornenes, and especially the 5-alkenyl-2-norbornenes wherein the alkenyl group contains about 3—20 carbon atoms and preferably 3—10 carbon atoms. Other bridged-ring hydrocarbons include polyunsaturated derivatives of bicyclo (2,2,2) octane as represented by bicyclo (2,2,2)-octa-2,5-diene, polyunsaturated derivatives of bicyclo (3,2,1) octane, polyunsaturated derivates of bicyclo-(3,3,1)-nonane, and polyunsaturated derivates of bicyclo-(3,2,2)-nonane. At least one double bond is present in a bridged-ring of the above compounds, and at least one other double bond is present in a bridged-ring or in a side chain. Further examples of polyunsaturated bridged-ring hydrocarbons and their use in the preparation of prior art rubbers are found in U.S. Pat. Nos. 2,933,480, 3,093,620, 3,093,621 and 3,211,709, the disclosures of which are incorporated herein by reference.

The preferred elastomers have molar ratios of ethylene to propylene chemically bound therein varying between 70:30 and 55:45. Specific examples of polyenes which may be used include 5-methylene-2-norbornene, 5-ethylidene-2-norbornene, 5-isopropylidene-2-norbornene, dicyclopentadiene, the methyl butenyl norbornenes such as 5-(2-methyl-2-butenyl)-2-norbornene or 5-(3-methyl-2-butenyl) norbornene, and 5-(3,5-dimethyl-4-hexenyl)-2-norbornene. The elastomer prepared from 5-ethylidene-2-norbornene is much preferred as it has outstanding properties and produces many unusual and unexpected results.

The polymerization solvent may be any suitable inert or saturated hydrocarbon which is liquid and relatively non-viscous under the reaction conditions, including the prior art solvents for the solution polymerization of monoolefins in the presence of a Ziegler catalyst. Examples of satisfactory hydrocarbon solvents include open chain saturated hydrocarbons containing 5—8 carbon atoms, of which hexane is usually preferred; aromatic hydrocarbons and especially those containing a single benzene nucleus such as benzene or toluene; and saturated cyclic hydrocarbons which have boiling ranges approximating those for the open chain and aromatic hydrocarbons discussed above, and especially saturated cyclic hydrocarbons containing five or six carbon atoms in the ring. The solvent may be a mixture of one or more of the foregoing hydrocarbons, such as a mixture of aliphatic and naphthenic hydrocarbon isomers having approximately the same boiling range as normal hexane. It is necessary that the solvent be dry and free of substances which will interfere with the Ziegler catalyst.

Catalysts in accordance with the prior art may be used in preparing the foregoing elastomers. In general, any suitable prior art Ziegler-type catalyst may be used which is known to produce a satisfactory elastomer. Ziegler catalysts are disclosed in a large number of issued patents, such as U.S. Pat. Nos. 2,933,480, 3,093,620, 3,093,621, 3,211,709 and 3,113,115, Examples include metal organic coordination catalysts prepared by contacting a compound of a metal of Group IVa, Va, VIa and VIIa of the Mendeljeff periodic chart of the elements, as typified by titanium, vanadium and chromium halides, with an organometallic compound of a metal of Groups I, II or III of the Mendelejeff periodic chart which contains at least one carbon-metal bond, as typified by trialkylaluminum and alkylaluminum halides wherein the alkyl groups contain 1—20 and preferably 1—4 carbon atoms.

The preferred Ziegler catalyst for polymerizing a monomeric mixture of ethylene, propylene and a diolefin is prepared from a vanadium compound and an alkylaluminum halide. Examples of suitable vanadium compounds include vanadium trichloride, vanadium tetrachloride, vanadium oxychloride, vanadium acetylacetonate, VO (tert-butyl)$_3$, etc. Activators which are especially preferred include alkylaluminum chlorides of the general formulas $R_1AlCl_2$ and $R_2AlCl$, and the corresponding sesquichlorides of the general formula $R_3Al_2Cl_3$, wherein R is a methyl, ethyl, propyl, butyl or isobutyl radical.

A catalyst prepared from methyl or ethylaluminum sesquichloride and vanadium oxychloride is especially preferred, and when using this catalyst, the optimum ratio of the catalyst components is usually 1 mol of vanadium oxychloride for each 8—20 mols of the alkylaluminum sesquichloride.

The foregoing detailed description, the drawings, and the following specific examples are for purposes of illustration only, and are not intended as being limiting to the spirit or scope of the appended claims.

EXAMPLE I

This example illustrates the method of the invention when using the apparatus shown in the accompanying drawings.

A terpolymer was prepared by continuously feeding the following ingredients to the reactor: ethylene in an amount of 15.7 pounds per hour, propylene in an amount of 58.1 pounds per hour, 5(mixed 2 and 3 methyl-2-butenyl)-2-norbornene in an amount of 1.65 pounds per hour, and pyridine equivalent to 3 moles for each mole of vanadium in the catalyst. The catalyst was prepared from vanadium oxytrichloride and methyl aluminum sesquichloride as the catalyst components. Each catalyst component was diluted with hexane in an amount to give a 0.05 molar concentration for the vanadium oxytrichloride solution and 20 weight percent for the methyl aluminum sesquichloride solution. The resulting two solutions were fed continuously into the contents of the reactor at points adjacent to the periphery of the rapidly rotating blades of the agitator and on opposite sides thereof. The components of the catalyst were fed to the reactor in amounts to provide a molar ratio of aluminum to vanadium of 15:1, and in overall quantities sufficient to maintain the reactor pressure at about 30 p.s.i.g. For example, the rate of catalyst feed was increased when the reactor pressure tended to rise above 30 p.s.i.g., and decreased when the pressure tended to drop below this level. The reaction temperature was 107° F.

A hexane solution containing the terpolymer, unreacted monomers, and catalyst was withdrawn continuously from the reactor. The resulting polymer cement was under about the same pressure that existed in the reactor, and it had a temperature of about 107° F, and contained 6 percent solids, i.e., 6 pounds of the terpolymer for each 100 pounds of hexane, unreacted monomeric material and other residuals.

The cement was pumped from the reactor at the rate of 1.2 gallons per minute and passed to the in-line mixer where it was vigorously contacted with fresh water. The water was fed to the mixer at ambient temperature at the rate of 0.75 gallon per minute. The catalyst was deactivated and the excess water solubilized the catalyst residues so that the ash-forming constituents could be washed from the polymer in subsequent processing equipment.

The mixture of water and cement was passed directly into the coagulator through a flash valve having an adjustable annular opening which formed a cone-shaped layer thereof. The width of the annular opening was adjusted to about one thirty-second to one-sixteenth inch to give the uniformly sized porous crumb that is desired when explosively flashing the hexane solvent and unreacted monomer content therefrom under the conditions described below. The pressure on the cement inlet side of the flash valve was 30—32 p.s.i.g., the pressure in the coagulator was 12 p.s.i.g., and the pressure drop across the flash valve was 20 p.s.i.g.

The steam supply to the coagulator was at 200 p.s.i.g. and had 100—150° F. superheat. The steam was passed to the annular header through a flow control valve regulated by a recording temperature controller, thereby producing the desired force to shred the cement into droplets which released the vaporizing hydrocarbons with the desired explosive action. In this example, all of the steam to the coagulator was passed through the annular header to thereby maintain the coagulator temperature and establish the polymer particle size. The coagulator agitator was operated to give sufficient agitation which swirled the water and polymer in the baffle-free vessel.

The polymer particle size was uniformly small (about ⅛—¼ inch diameter) and porous. The total steam flowing to the coagulator was 300—400 pounds per hour. The polymer was slurried with water and the water was maintained at a temperature of 200—230° F.

Water was passed into the coagulator at a controlled rate at a location just above the agitator blade to improve the washing action and maintain the polymer slurry concentration at about 1.5—3 percent by weight. The hydrocarbon gas flow from the coagulator was about 440 pounds per hour.

The agitation characteristics in the coagulator were such that the uniformly small and porous crumb which was formed initially was preserved. Interparticle collisions of the polymer crumb occurred to some extent, but with this type of agitation and in the absence of baffles in the coagulator, the impact of the particles was not sufficient to cause problems with agglomeration of the crumb. At the same time there was sufficient movement between the polymer particles and liquid to wash out the catalyst and activator residues.

The average residence time in the coagulator was 20—40 minutes and, at the end of this time, the hot (200—230° F.) wet polymer crumb was almost completely free of hexane and unreacted monomers. The crumb was then removed from the bottom of the coagulator and passed to a stripper operating at atmospheric pressure.

The stripper was vented to the atmosphere and equipped with an agitator which was operated to maintain a medium degree of agitation. The crumb particles were kept in suspension while swirling in the baffle-free stripping vessel. Superheated steam was passed into the vessel at a rate of about 100—150 pounds per hour, which maintained a temperature of 210° F. for the slurried crumb and water. The average residence time for the crumb in the stripper was about 30 minutes, and the remaining 0.5 percent of the unreacted monomers and solvent were removed.

The polymer crumb was passed from the stripper to a washing zone and then to a dryer. The resulting dry crumb was passed to a baler where it was baled. The final polymer product had only 0.01—0.03 percent by weight of ash content, and it was uniformly porous so that fast drying rates could be realized in a tunnel-shaped dryer.

In a second run, the water was separated from the polymer cement after the catalyst deactivation step and prior to passing the resulting water-free cement into the coagulator. Comparable results were obtained and there was no noticeable difference between the two runs.

EXAMPLE II

This example illustrates the prior art practice of passing the polymer cement directly into the coagulator without using the steam shredding device of the invention for breaking up the polymer solution into a subdivided form.

The procedure of example I was followed, except that no steam was passed through the annular header. Sufficient steam to volatilize the hexane solvent and residual monomers was passed into the coagulator at a point directly across and 180° from the inlet at which the cement was introduced.

The polymer crumb produced by this procedure varied from one-fourth inch to as large as 2 inches in diameter. It was nonporous, and in the form of tacky agglomerates which resulted in increased horsepower requirements for the agitator. It was necessary to shut down the line for the removal of large polymer deposits after about one hour of operation.

Examination of the polymer crumb from the coagulator indicated that the hexane solvent was not removed sufficiently. Also, the fluidity of the polymer-water slurry was such that it could not be satisfactorily handled due to the large agglomerates. The polymer which did reach the stripper was inadequately stripped of hexane.

The crumb had very little porosity, and drying in a tray or tunnel dryer was difficult. Also, the crumb size was not uniform. Proper washing of the crumb could not be achieved and it had a high ash content of 0.5 percent by weight or higher.

EXAMPLE III

This example illustrates operation in accordance with example I, with the exception of flashing the unreacted monomers from the polymer cement before passing it to the coagulator.

The unreacted monomers were flashed from the polymer cement in the separator. The cement was then fed to the coagulator while using steam from the annular header to shred the cement. The crumb size was small and uniform, but this porosity was much less than when operating in accordance with example I. The polymer crumb could not be washed substantially free of the catalyst residues as in Example I. Also, the polymer crumb did not dry as satisfactorily as in example I when using a tunnel-type hot-air dryer.

What we claim is:

1. Apparatus for recovering normally solid polymeric material from a solution thereof in a volatile organic solvent comprising a vessel means; means for introducing to said vessel means a liquid in which said polymeric material is insoluble to partially fill said vessel means and provide a liquid zone therein with a vapor space thereabove; a conduit communicating with the interior of said vessel means for supplying the polymer solution to said vessel, said conduit terminating in an annular valve seat having a diverging frustoconical seating surface frustoconically; a below the liquid level established therein shaped valve member having a peripheral surface corresponding to said seating surface of said valve seat with the smaller end of the frustum extending toward said valve seat whereby said seating surface of said valve seat and said peripheral surface of said valve member define a hollow, frustoconical space therebetween for extruding a cone-shaped layer of polymer therethrough, said valve member being mounted for axial movement relative to said valve seat whereby the width of said space can be varied by displacement of said valve member relative to said valve seat to vary the thickness of the cone-shaped layer of polymer; a fluid jet means mounted adjacent to the space defined between said seating surface and said peripheral surface, said fluid jet means adapted to supply a fluid under pressure to impinge upon the cone-shaped layer of polymer extruded through said space to break up the cone-shaped layer of polymer into solid particles of polymer; means for agitating liquid in the vessel means to thereby maintain particles of solid polymer in suspension therein, means for withdrawing gases including solvent vapor from above the said zone in the vessel means, and means for withdrawing liquid containing particles of solid polymer suspended therein from the vessel means.

2. The apparatus of claim 1 wherein the means for introducing liquid includes conduit means for introducing water into said vessel means.

3. The apparatus of claim 1 wherein the vessel means is free of internal baffles in the said liquid filled zone, and wherein the means for agitating provided is a rotary agitation means whereby a swirling motion is imparted to the liquid.

4. The apparatus of claim 1 wherein the frustoconically shaped valve member is mounted on the inner end of a valve stem, the valve stem extends within the conduit from the frustoconically shaped member upstream past the wall of the vessel and then the outer end thereof passes through the wall of the conduit, and means is provided on the outer end of the valve stem for axially moving the valve stem and the frustoconically shaped valve member mounted thereon to thereby vary the thickness of the extruded layer of polymer solution.

5. The apparatus of claim 1 wherein said fluid jet means includes an annular header mounted near the interior end of said conduit, the header having a plurality of openings therein spaced around its circumference through which fluid under pressure is free to escape in a direction whereby the resulting fluid jets impinge upon the cone-shaped layer of extruded polymer, and means is provided for supplying fluid under pressure to the header.

UNITED STATES PATENT OFFICE
CERTIFICATE OF CORRECTION

Patent No. 3,596,700      Dated August 3, 1971

Inventor(s)    Stanford E. Groves et al.

It is certified that error appears in the above-identified patent and that said Letters Patent are hereby corrected as shown below:

Column 5, line 14, "53" should read -- maintained --.

Signed and sealed this 22nd day of February 1972.

(SEAL)
Attest:

EDWARD M. FLETCHER, JR.            ROBERT GOTTSCHALK
Attesting Officer                   Commissioner of Patents